United States Patent [19]

Howard

[11] 4,080,416
[45] Mar. 21, 1978

[54] METHOD FOR MAKING MULTI-LAYER MOLDED PADDED PRODUCTS

[75] Inventor: Jack E. Howard, Culver City, Calif.

[73] Assignee: International Fabric Molders, Inc., Culver City, Calif.

[21] Appl. No.: 682,608

[22] Filed: May 3, 1976

Related U.S. Application Data

[63] Continuation-in-part of Ser. No. 560,168, Mar. 20, 1975, abandoned.

[51] Int. Cl.² ............................................. B29D 9/00
[52] U.S. Cl. ................................ 264/258; 264/257; 264/292; 264/324; 264/325
[58] Field of Search ............... 264/257, 258, 292, 324, 264/325, 327; 405/384

[56] References Cited

U.S. PATENT DOCUMENTS

| | | | |
|---|---|---|---|
| 2,285,967 | 6/1942 | Hardy | 264/292 X |
| 2,680,882 | 6/1954 | Hirschmann | 264/292 |
| 2,924,852 | 2/1960 | Michalko | 264/324 X |
| 2,942,297 | 6/1960 | Michalko | 425/384 X |
| 2,983,955 | 5/1961 | Gajdosik | 264/292 X |
| 3,164,655 | 1/1965 | Howard | 264/321 |
| 3,461,504 | 8/1969 | Becker | 264/327 R |
| 3,516,122 | 7/1970 | Schwartz | 425/384 X |
| 3,799,174 | 3/1974 | Howard | 156/224 X |

Primary Examiner—Richard R. Kucia
Attorney, Agent, or Firm—Robert C. Comstock

[57] ABSTRACT

A apparatus and method for making multiple layer molded padded products comprising at least three layers, the intermediate layer comprising padding. All of the layers are formed on male molds which are cast from a single master mold, thereby reducing mold costs and assuring perfect matching of the layers. The entire area of the female mold on which the intermediate layer of padding is formed is either completely cut away or is spaced away from the male mold so that the thickness of the pad is not substantially reduced during the molding operation. The female mold is heated and acts as an oven to draw back compressed fiberfill padding and/or to cure polyurethane foam padding.

3 Claims, 13 Drawing Figures

METHOD FOR MAKING MULTI-LAYER MOLDED PADDED PRODUCTS

REFERENCE TO RELATED APPLICATION

This application is a continuation-in-part of my application Ser. No. 560,168 filed Mar. 20, 1975, now abandoned.

BACKGROUND OF THE INVENTION

1. Field of the Invention

The invention relates to a method for making multi-layer molded products, particularly garments. The invention is particularly adapted for use in making multi-layer seamless brassiere pads or breast fronts for use in brassieres. The invention may also be used for making other garments such as quilts, gowns, gloves, etc.

2. Description of the Prior Art

At the present time, a three-layer breast cup having inner and outer layers of fabric with a layer of padding therebetween requires numerous molding and fabricating operations. These are costly to the manufacturer, particularly in labor and handling costs. The finished product often has seams which contact the body, making the garment both unsightly and uncomfortable to wear.

If a breast cup or other garment is formed by molding, it has been necessary in the past to provide at least two and in most cases three different master molds formed of plaster, from each of which a quantity of aluminum molds was cast. One mold was required for molding the inner portion of the garment, a larger mold for molding the outer portion of the garment and a third mold for molding the center padding. Since many sizes and styles are required, the molding costs have been extremely high.

It has also been customary in the past to perform a number of sewing operations in forming the garment, which operations are costly to the manufacturer.

Past methods of manufacturing garments have not been adaptable for use with different types of fabrics and materials, which react differently to molding operations and particularly to the application of heat, pressure and stretching to conform to a three dimensional mold.

At the present time, in making products having a thick layer of padding, the padding may be stretched during the molding operation, thereby losing the high loft which it had in its natural state prior to molding.

There is also presently a problem in performing sewing or stitching operations on molded products having a portion of padded material due to the excessive thickness of the padding, which renders sewing operations difficult. The padding is also inclined to be loose in texture, so that the stitching is not as successful as desired in holding the padding in place.

SUMMARY OF THE INVENTION

The present invention provides a method whereby a single master mold can be used to form the aluminum molds for all of the layers of a mult-layer breast cup having a substantially thick center layer of padding. The invention eliminates the differences and dimensional variations which unavoidably result from the use of different molds. It greatly reduces both the cost and the development time required when two or three molds must be made.

The pads, covers and linings of breat cups have in the past most frequently been produced separately on different molds and then matched together for sewing by the breassiere manufacturer. Costly cutting, sewing and gluing operations have been required in manufacturing the finished breast cup. With the present invention, the layers of the breast cup are automatically matched because they all come from the same mold and they may even be united in the molding operation.

In the past, each of the layers of a molded breast cup was formed on a different set of molds comprising a male mold and a female mold which completely enclosed the male mold. With this invention, the female mold which is used in molding the padding either alone or in combination with other layers is "open" and engages the male mold only around the outer periphery of the breast cup or other product being formed. The remainder of the female mold is either completely cut away or is spaced away from the male mold a sufficient distance so that it will not compress the padding.

The material used for the center padding formerly had to be cut and pre-formed into cones or the like prior to being molded. With the present invention, it is possible to mold a flat sheet of padding material to the desired three dimensional shape without any pre-forming or shaping operations being required.

The present invention can be used to mold any of the three layers individually or to mold the inner lining and padding simultaneously in one molding operation and then the outer lining in a separate molding operation. The outer lining may be molded alone or it may be molded directly to the previously formed inner lining and padding, thereby completing the breast cup and providing a complete unitary breast cup or "package" for the brassiere manufacturer.

Another object of the invention is to provide a method for making breast cups and other padded products in which the desired loft of the padding can be achieved, thereby providing softness in the finished garment.

A further object of the invention is to provide products having padding in which the padding is not substantially compressed or reduced in thickness during the molding operation.

Another object of the invention is to provide such a method which are more economical than the prior art both in mold costs and in manufacturing operations and costs.

It is particularly an object of a method set forth in the present application to utilize a heated and preferably inverted female mold as a virtual oven to draw back the loft into fiberfill material and/or to provide the amount of heat necessary to cure polyurethane foam material.

Another object of the invention is to provide an area which extends around the periphery of the pad in which the padding is highly compressed in order to facilitate sewing operations. The compressed area may also extend to shoulder portions or other areas in which the molded material must be bent or in which undesirable bulk should preferably be eliminated.

DESCRIPTION OF THE PREFERRED EMBODIMENT

Figure 1:
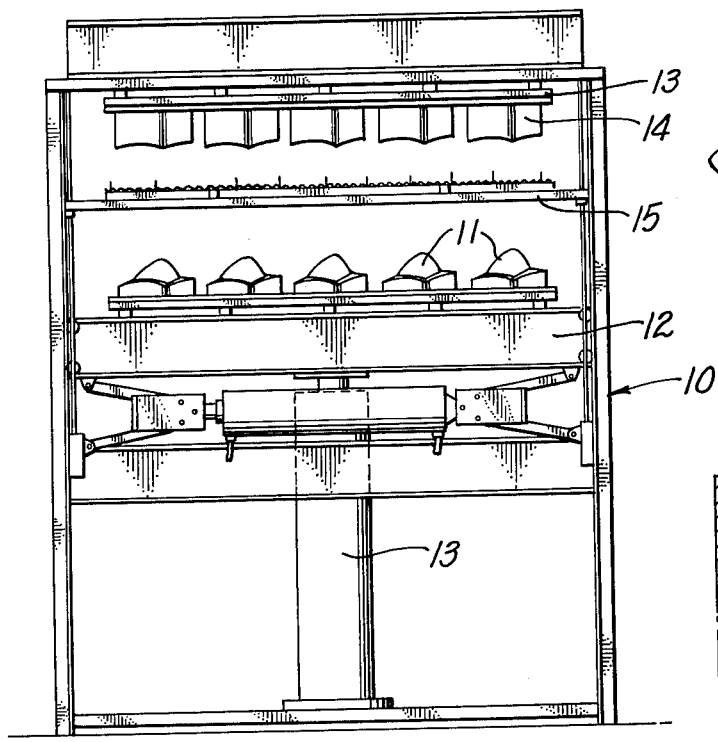
FIG. 1 is a side elevational view of a molding press with a set of molds mounted thereon.
Figure 3:
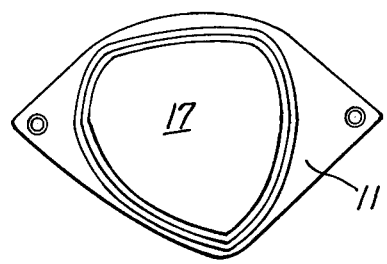
FIG. 3 is a sectional view on a reduced scale from FIG. 2 taken on line 3—3 of FIG. 2.

A preferred embodiment which has been selected to illustrate the invention comprises a conventional hydraulic molding press 10. In FIG. 1, a plurality of male molds 11 are mounted on a support member 12 which is mounted for reciprocal vertical movement by a hydraulic ram 13, which has the upper end of its piston connected to the support member 12.

A plurality of complementary stationary female molds 14 are mounted directly above the male molds 11 on a support plate 13. A tenter frame 15 extends horizontally between the molds 11 and 14 and is adapted to hold the layers or material used to form the garment.

The frame 15 is mounted for vertical reciprocal movement on guide rods 17. Coil springs 18 mounted on the guide rods 17 exert pressure urging the frame 15 and material upwardly when the molds are closed.

Figure 11:
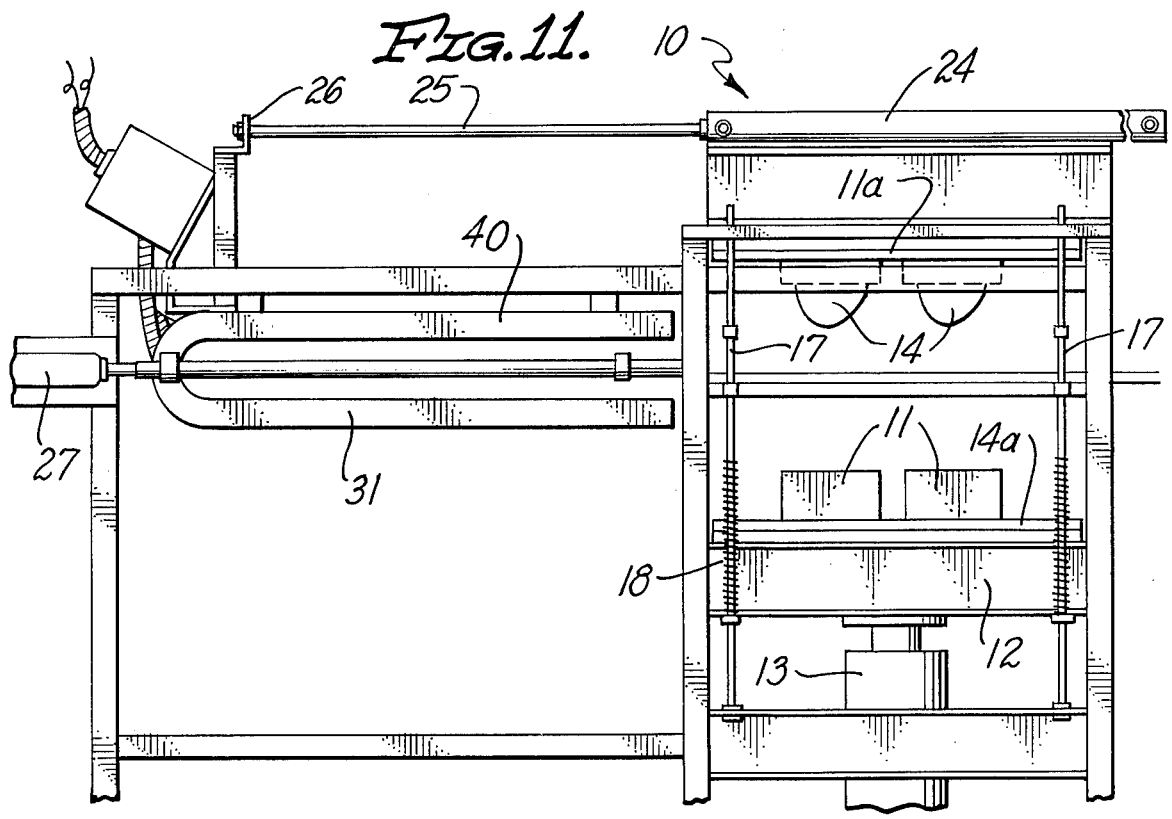
FIG. 11 is a side elevational view of a molding press having means for heating the material rpior to molding and showing the female molds inverted.

In FIG. 11, a substantially U-shaped heater rack 19 is mounted for sliding reciprocal horizontal movement between two positions, in one of which its upper portion 40 and lower portion 31 are disposed directly above and beneath the layers of material and extend substantially parallel thereto. This is the heating or operating position, in which heat is applied to the material to prepare it for the molding operation. The upper portion 40 and lower portion 31 of the heater rack 19 have a plurality of electrically operated heating rods.

The heater rack 19 is moved from this position to a retracted or non-operating position in which it is slidably moved horizontally outwardly so that the molds can be closed to perform the molding operation after the material has been sufficiently heated.

Reciprocal movement of the heater rack 19 is effected by the operation of a hydraulic cylinder 24, which is mounted on the upper part of the press 10. The end of its piston 25 is connected to a vertically directed arm 26 which is in turn connected to the heater rack 19. A shock absorber 27 is provided to cushion the movement of the heater rack 19.

It is important to the present invention that a single set of molds can be used to mold and form the entire garment, which by way of example may comprise a breast cup having an inner fabric lining 20, a central layer of padding 21 and an outer fabric cover 22. The padding 21 may be formed of fiberfill, polyurethane or any other similar material which will provide the same somewhat resilient padding effect.

In the past, it has not been possible to use a single set of molds to form all of these layers because a larger mold would be required to form the cover 22 so that it would properly fit around the lining 20 and padding 21. The molds used in the past have also been closed molds, as in my U.S. Pat. No. 3,799,194, in which the male and female molds are completely complementary and engage across their entire area when closed, with no space between them, thereby compressing the padding during the molding operation.

It has been found that by cutting away or opening the entire area of the female mold other than the periphery and by forming the padding layer entirely on the male mold, it is possible to utilize a single set of molds for forming all of the layers of the garment. This cuts the molding costs at least in half, as well as greatly reducing assembly costs and simplying assembly operations.

Figure 2:
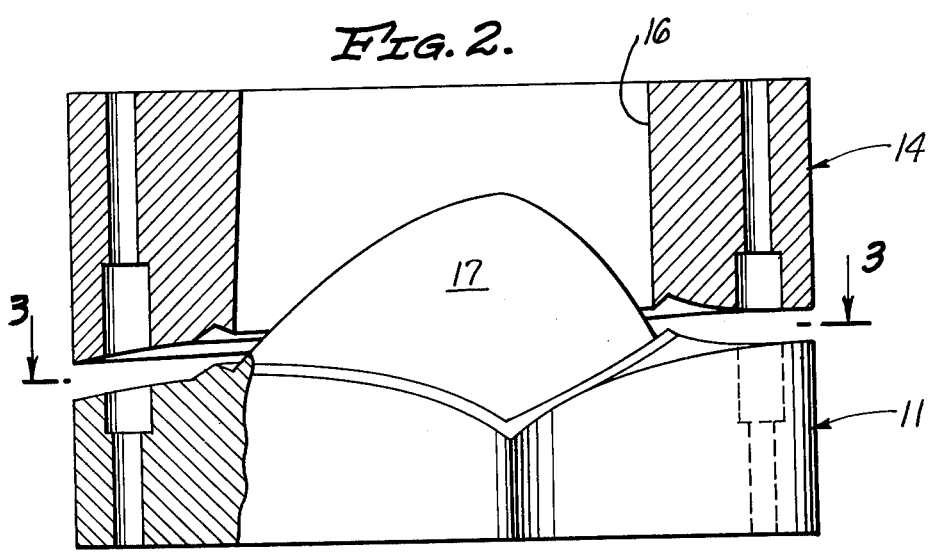
FIG. 2 is an enlarged sectional view of a male and female mold in partly closed position.

The opening of the female mold preferably takes the form shown in FIG. 2 of the drawings, in which the central portion of the female mold is entirely cut away, leaving an opening 16 which extends across the entire area within the periphery of the product being molded.

The opening or separation of the female mold permits all of the parts to be formed on aluminum molds cast from a single master mold. This results in complete compatability of all of the layers of the garment. It reduces the mold costs and eliminates hand sewing operations. It also avoids the necessity for the manufacturer to match the layers of the garment so that they are perfectly complementary before completing the manufacture of the garment. The hollow or open female mold also allows for the fluffiness of the padding 21 in order to retain its softness.

In a typical breast cup molding operation, the flat fabric forming the lining 20 may be molded separately or, if the padding comprises fiberfill, the lining 20 may be pre-laminated to the flat padding material in a pre-molding operation. These flat pre-laminated layers are then molded into a three dimensional shape, utilizing the molding press 10 and molds 11 and 14. If the padding material is polyurethane, there is no pre-lamination, but the lining 20 and padding 21 may be placed in the mold either separately or together. If molded together, there is some tacky adherence of the lining 20 and padding 21 caused by the molding operation.

The outer cover 22 may then be molded in the same molding press 10 and on the same molds 11 and 14. The cover 22 may be molded alone or it may be molded over the previously molded lining 20 and padding 21 to provide a complete breast cup. In the latter case, the lining 20 and padding 21 act like and in effect become part of the male mold 11 on which the outer cover 22 is formed.

Although the major portion of the female mold is open, the portion which extends around the periphery of the part being molded may taper into close proximity to the male mold so that the molded part is provided with a thin or feather edge. Such an edge is convenient for sewing or bending around another piece with sewing passing through the two overlapping thicknesses.

This type of construction is frequently used in brassieres and other garments.

Figure 4:
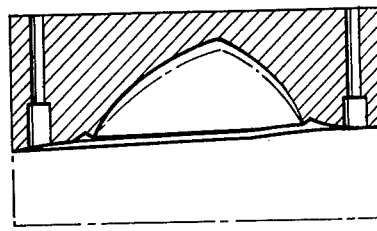
FIG. 4 is an elevational view of a male mold and a sectional view of a female mold in closed position, the female mold being spaced as in FIG. 5.

In some cases, it may be desirable to have non-compressing engagement between the inner portions of the female mold and the padding 21 alone or in combination with other layers. One example is in order to use the female mold for the purpose of providing a limit to the vertical rise or projection of the pad. Another example is to provide a smoothing of the outer cover 22 by a light ironing type engagement with the female mold. In such cases, the inner portion of the female mold is not cut away, but is closed as shown in FIGS. 4 and 5 of the drawings.

Figure 5:
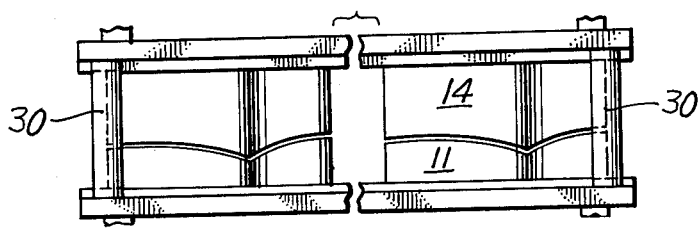
FIG. 5 is an elevational view partly broken away to reduce the length of the figure, showing the use of spacer members in a molding press to prevent the male and closed female molds from completely closing.
Figure 6:
FIG. 6 is an enlarged sectional view of the three layers forming a garment or other product.
Figure 7:
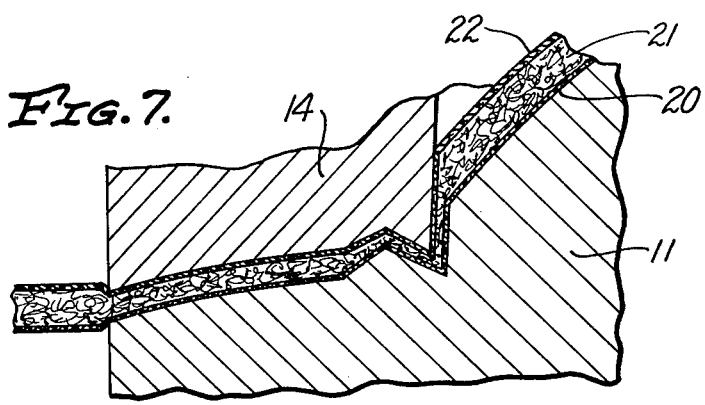
FIG. 7 is a partial sectional view of the molds in FIG. 2 in completely closed position.
Figure 8:
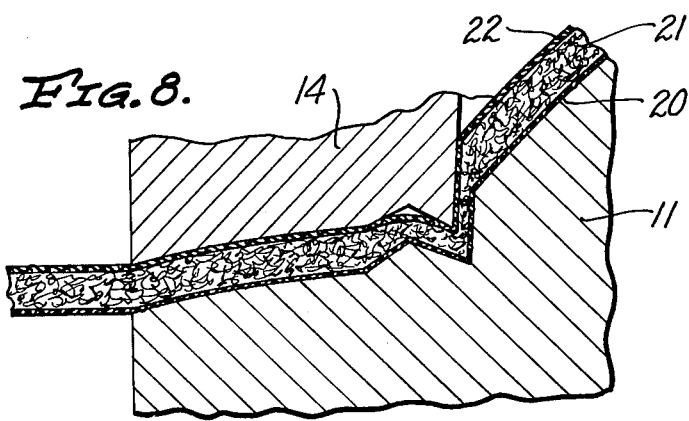
FIG. 8 is a partial sectional view of the molds of FIG. 2 in partially closed position.
Figure 9:
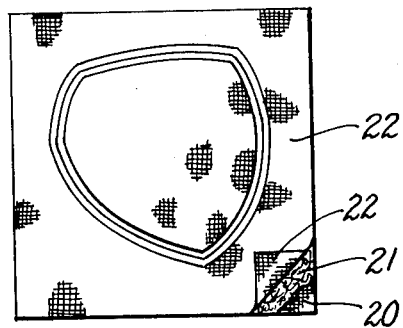
FIG. 9 is a top plan view of an uncut breast cup, with the corners folded back to show the layers.
Figure 10:
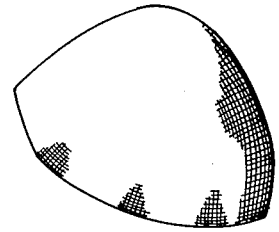
FIG. 10 is an isometric view of a molded and cut three dimensional breast cup.

In order to prevent compression of the padding during the molding, a plurality of vertically directed spacer devices 30 are placed in the molding press to prevent the male and female molds from engaging each other in closed position and to thereby provide substantial space and separation between the male and female molds, as shown in FIG. 5 of the drawings.

The spacer devices 30 may conveniently be disposed adjacent to the four corners of the press and are slightly greater in length than the distance between the support members 12 and 17 when the molds are completely closed. The separation between the molds provided by the spacer members 30 is customarily only a fraction of an inch. This separation is sufficient to provide space for the fiberfill to expand.

The purpose of the spacer devices 30 is to provide sufficient spacing between the male and female molds so that the effect is comparable to that of the open female mold described above. The spacing should be such that there is no substantial compressing engagement between the female mold and the padding, whether it is molded alone or in combination with the other layers.

In all cases, the molding and three dimensional forming of the raised portion of the garment is performed upon and determined by the surface of the male mold alone, while the molding of the peripheral cutting edges of the garment or other product is performed upon and determined by the peripheral portion of the female mold.

Since certain fabrics, such as knits and loosely woven materials shrink back when subjected to head and/or molding, this may be counteracted by adding a layer of epoxy resin approximately ⅛ inch thick over the male mold. This resin hardens and becomes a permanent part of the mold, increasing its dimensions sufficiently to compensate for the shrinkage of the fabric. The coated mold cannot be heated, since heat would melt the epoxy resin. It is accordingly necessary to heat only the fabric and not the mold when using an epoxy resin coated mold.

In order to achieve the results of the invention, it is essential that the padding 21 (whether molded alone or in combination with one or more other layers) must always be molded with an open female mold. The term "open" means a female mold which is completely cut away or one which is spaced away from the male mold a sufficient distance to avoid compressing the padding during the molding operations. The inner and outer layers, if molded alone, may be molded on a closed mold instead of an open mold, since they have no thickness to compress.

In the case of breast cups having polyurethane padding, the inner lining and polyurethane must be hot molded, while the outer cover may be cold molded with epoxy resin coating on the male mold as described above.

In molding the inner lining 20 and padding 21 simultaneously, both layers are preferably pinned to the tenter fame 15 prior to molding. In forming a "package" comprising a complete breast cup, one of the layers (either the combined inner lining and pad or the outer cover) is preferably pinned to the tenter frame 15, while the other layer is left free.

In making a breast cup with polyurethane padding, the inner and outer layers of cloth which form the inner lining 20 and outer cover 22 are pinned to the tenter frame 15. The center polyurethane padding layer 21 is left free and unpinned so that it can move into the desired three dimensional contour without its loft being restricted.

In using the molding press shown in FIG. 11, the materials to be heated are placed on the frame 15. The cylinder 24 is then energized to move the heater rack 19 to its heating position. Heat is then applied to the heating rods and transferred by radiation to the top and bottom of the material. After the materials have been sufficiently heated, the heater rack 19 is retracted and the hydraulic ram 13 energized to move the female molds 14 upwardly. The female molds 14 engage the materials as they move upwardly and carry the materials and frame 15 upwardly so that the materials are held between the closed molds.

The molds remain closed a short period of time while the molding operation is completed. The ram 13 is then released to retract its piston and thereby move the female molds 14 back down to their normal positions. The frame 15 moves back to its normal position and the molded materials are then removed from the frame 15.

Suitable micro-switches are provided to prevent the ram 13 from operating until the heater rack 19 is in its fully retracted position and to prevent the heater rack 19 from moving the operating position until the molds are fully open.

Figure 12:
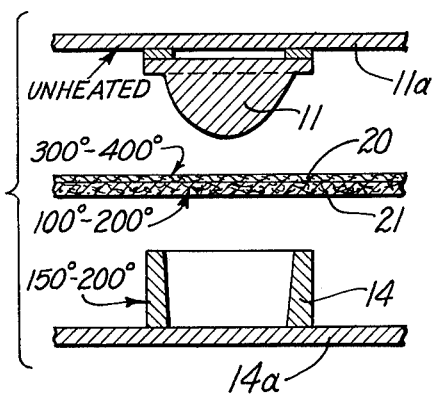
FIG. 12 is a schematic view showing the type of heat preferably applied in forming a layer of fiberfill padding simultaneously with a layer of inner lining.

As indicated in FIG. 12 of the drawings, the top fabric inner lining 20 may be heated to a temperature of 300°–400° F., preferably 340° F., while the bottom fiberfill layer 21 is heated very little, such as to approximately 100° F. to 200° F.

Conventional means not shown in the drawings are used to heat the support plate 14a and female molds 14 to a temperature of approximately 150°–200° F. The male molds 11 are left unheated.

When the female molds 14 are moved upwardly, they engage the bottom fiberfill layer 21 and exert pressure on both layers 20 and 21, causing them to be deformed around the contour of the male mold 11. This tends to cause the fiberfill layer 21 to become compressed and thinned as it is pressed and stretched into the shape of the male molds 11. Such compression and stretching would normally substantially reduce the loft or rise of the fiberfill.

With the present invention, the loft or rise of the fiberfill material is retained and/or restored by providing an open space between the adjacent portions of the molds 11 and 14 into which the fiberfill 21 can be drawn and expanded. As the molds close, this open space becomes an oven which is heated by heat radiated from the female mold 14 and the heated support plate 14a which covers the end of the female mold 14. As the fiberfill material becomes heated, it expands to restore or increase its loft.

If the padding comprises polyurethane foam, this heat assures proper curing of the foam padding material.

Figure 13:
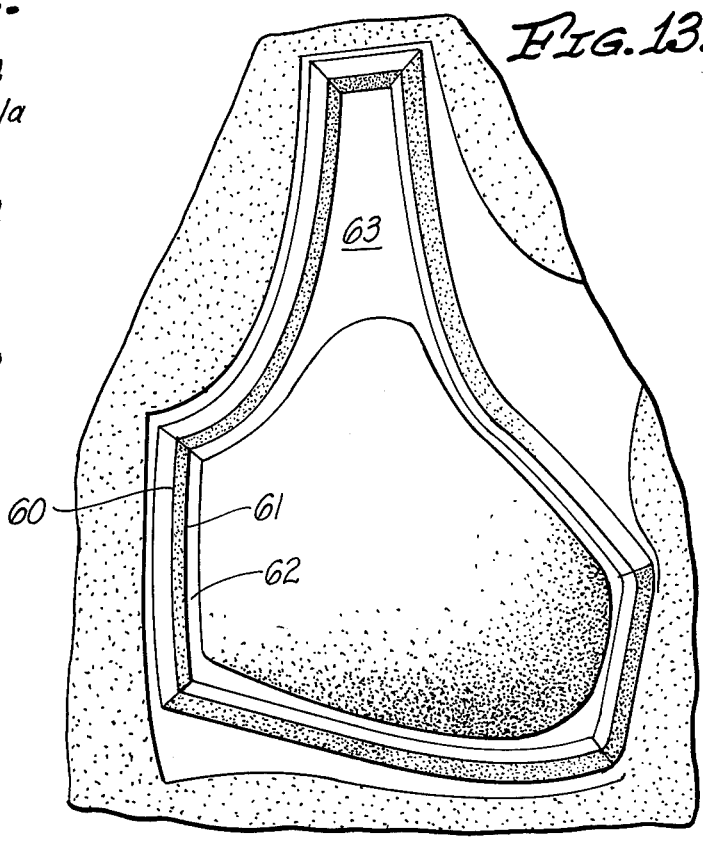
FIG. 13 is a top plan view of a molded pad with a compressed peripheral edge and shoulder strap prior to cutting.

As shown in FIG. 13, the edges of the molds 11 and 14 are preferably brought into engagement with each other around their entire peripheries in order to form an inverted V-shaped flattened portion 60 around the entire edge of the breast pad or front for trimming purposes. The trim line preferably extends along the inner edge 61 of the V-shaped flattened portion 60.

Extending inwardly from the trim line edge 61 is a flat sewing portion 62 which extends continuously around the entire periphery of the molded pad or front. The flat sewing portion 62 may also extend continuously and connect with a flat shoulder strap portion 63.

The flat sewing portion 62 is used to facilitate sewing or stitching the breast pad or front into a brassiere. If this area is not flattened, it becomes difficult to sew because of its thick and fluffy nature. The flat shoulder strap portion 63 facilitates bending this portion of the pad over the shoulder of the wearer, eliminating undesiraable bulk in this area.

I claim:

1. The method of forming a breast pad having a substantially thick layer of padding disposed adjacent to a relatively thin layer of fabric, said method comprising molding said layers simultaneously on a three dimensional male mold and a female mold, the entire inner area of said female mold being spaced away from the adjacent inner area of said male mold a distance at least equal to the thickness of the molded layer of padding, so that the portions of said padding forming the inner area of said pad are not compressed during said molding by engagement with said female mold, said female mold having a peripheral portion which engages the peripheral portion of said male mold around the entire periphery of said molds, thereby compressing and deforming said layers between the engaging peripheral portions of said molds simultaneously with the molding of the inner portions of said layers to form a precise cutting edge defined by the peripheral portions of said molds, said cutting edge extending around the entire periphery of each layer of said pad, said male mold being unheated and said female mold being heated and facing upwardly to form a heated enclosure which surrounds said male mold during the molding of said layers, said layer of fabric being heated to a temperature between 300° F. and 400° F., said padding being heated to a temperature between 100° F. and 200° F., and said female mold being heated to a temperature between 150° F. and 200° F.

2. The method described in claim 1, in which the peripheral portion of said male and female molds are in engagement with each other across an area adjacent to said cutting edge to form a flat sewing portion of reduced thickness which extends continuously around substantially the entire periphery of the molded pad to facilitate sewing of said pad into a brassiere.

3. The method described in claim 2, in which portions of said male and female molds are in engagement with each other to form a flat shoulder portion of reduced thickness which is integral with said flat sewing portion, said shoulder portion being adapted to prevent undesirable bulk in the shoulder area of a brassiere incorporating said pad.

* * * * *